United States Patent [19]

Convertino et al.

[11] Patent Number: 5,667,672
[45] Date of Patent: Sep. 16, 1997

[54] AQUARIUM UNDERGRAVEL FILTER

[75] Inventors: Steven Convertino, West Paterson, N.J.; Jonas Ivasauskas, West Nyack, N.Y.

[73] Assignee: Warner-Lambert Company, Morris Plains, N.J.

[21] Appl. No.: 628,824

[22] Filed: Apr. 5, 1996

[51] Int. Cl.⁶ ............................................. A01K 63/04
[52] U.S. Cl. ........................... 210/169; 210/293; 210/456; 210/805
[58] Field of Search .................... 210/169, 293, 210/416.2, 456, 767, 805

[56] References Cited

U.S. PATENT DOCUMENTS

| | | | |
|---|---|---|---|
| 2,636,473 | 4/1953 | Schwartz et al. | 210/169 |
| 2,935,199 | 5/1960 | Willinger | 210/169 |
| 3,119,774 | 1/1964 | Arak | 210/169 |
| 3,827,560 | 8/1974 | Morton | 210/169 |
| 3,867,292 | 2/1975 | Cornell | 210/169 |
| 4,995,980 | 2/1991 | Jaubert | 210/169 |
| 5,066,394 | 11/1991 | Harrison | 210/169 |
| 5,171,437 | 12/1992 | Fletcher, Sr. | 210/169 |
| 5,536,398 | 7/1996 | Reinke | 210/169 |

Primary Examiner—Neil McCarthy
Assistant Examiner—Theodore M. Green
Attorney, Agent, or Firm—Charles W. Almer

[57] ABSTRACT

The present invention is directed to an aquarium undergravel filter. In particular, the undergravel filter of the present invention contains chambers on its underside. The chambers, which are roughly equal in size, are separated by baffles and have openings which allow water to flow into flow channels which lead to the lift tube holes. The chambers and flow channels provide for equal filtration over the entire surface of the filter plate. In a preferred embodiment, the undergravel filter of the present invention also contains an anti-dig grid which prevents fish from digging the gravel on the plate of the filter by use of an anti-dig grid. The anti-dig grid is located on the top surface of the filter and prevents fish from removing the gravel and exposing the openings in the filter.

19 Claims, 6 Drawing Sheets

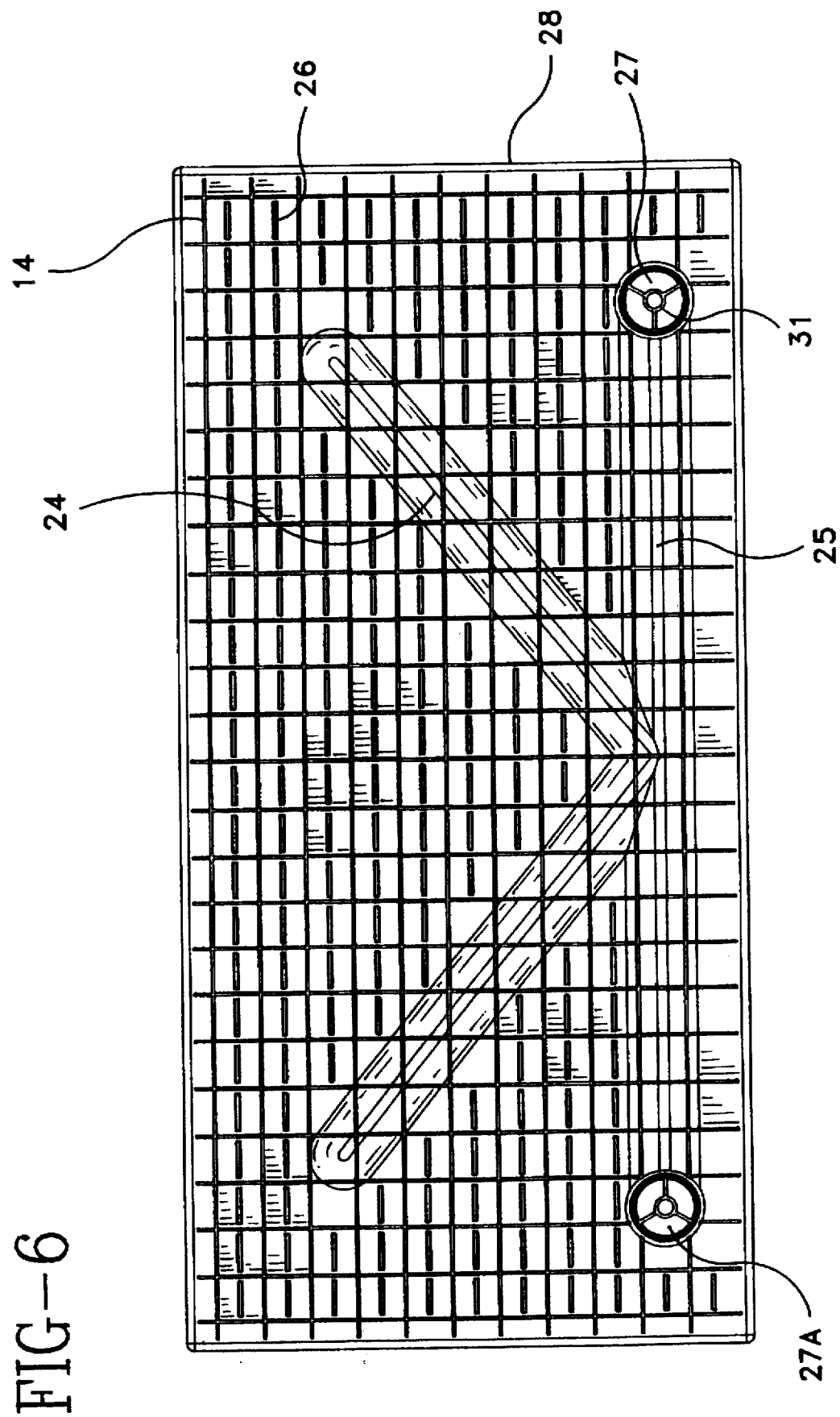

5,667,672

AQUARIUM UNDERGRAVEL FILTER

FIELD OF THE INVENTION

The present invention relates to aquarium filters, and in particular to aquarium undergravel filters.

BACKGROUND OF THE INVENTION

Undergravel filters, particularly those having a number of flow-through openings, are commonly used in many aquariums. During use of undergravel filters, water is drawn downward through the openings due to suction created by airlifts or powerheads which are commonly arranged at one or two corners of the filter. After passing through the openings in the filter, the water is drawn under the filter until it randomly reaches a lift tube hole which allows the water to be drawn upward through a lift tube. Undergravel filters of this type are commonly covered with gravel to provide both mechanical and biological filtration.

Several problems exist with undergravel filters which are currently commercially available. First, water which is drawn through the openings follows a random, non-structured path under the filter before it reaches a lift tube. Consequently, water is preferably drawn through the filter near a lift tube, while water is drawn through the filter far from the lift tube only as the closer tube becomes clogged with debris. This randomness in drawing water through the lift tube leads to uneven filtration throughout the entire aquarium. In addition, fish frequently dig and move the gravel. This often exposes the openings in the filter directly to the water and allows water to pass through the openings, creating a path of least resistance and reducing the efficiency of the remainder of the filter.

In light of the problems with currently available undergravel filters, it would be advantageous to provide an undergravel filter which would address these problems. Consequently, it is an object of the present invention to provide an undergravel filter which will lead to even filtration over the surface of the entire filter and, in a preferred embodiment, will prevent fish from digging and moving gravel.

SUMMARY OF THE INVENTION

The present invention is directed to an aquarium undergravel filter. In particular, the undergravel filter of the present invention contains chambers on its underside. The chambers are separated by baffles and have openings roughly equal in size which allow water to flow into flow channels which lead to the lift tube holes. The chambers and flow channels provide for equal filtration over the entire surface of the filter plate. In a preferred embodiment, the undergravel filter of the present invention also contains an anti-dig grid which prevents fish from digging the gravel on the plate of the filter. The anti-dig grid may be either permanently or removably located on the top surface of the filter and prevents fish from removing the gravel and exposing the openings in the filter.

BRIEF DESCRIPTION OF THE DRAWINGS

FIG. 6 is a top view of the undergravel filter of the present invention.

DETAILED DESCRIPTION OF THE PREFERRED EMBODIMENTS

Figure 1:
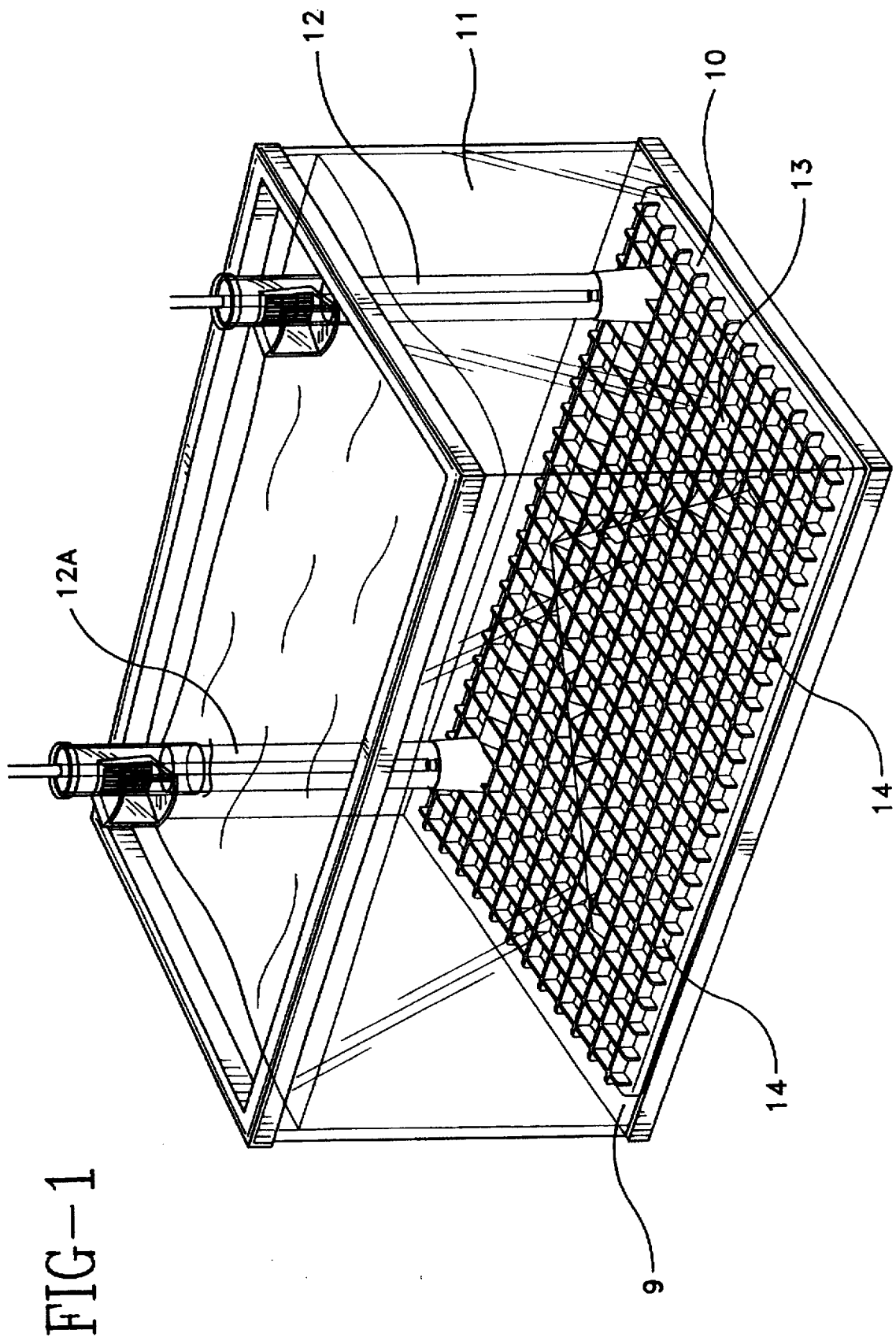
FIG. 1 is a perspective view of the undergravel filter of the present invention as placed within an aquarium tank.

The present invention is directed to an aquarium undergravel filter which provides for even filtration throughout the entire surface plate of the filter. FIG. 1 illustrates the undergravel filter 10 in its operating position on the bottom floor 9 of an aquarium tank 11. The embodiment illustrated contains two lift tubes 12 and 12A, however any number of lift tubes may be used with the filter. In the preferred embodiment illustrated, an anti-dig grid 13 is located on the top side of the filter.

Figure 2:
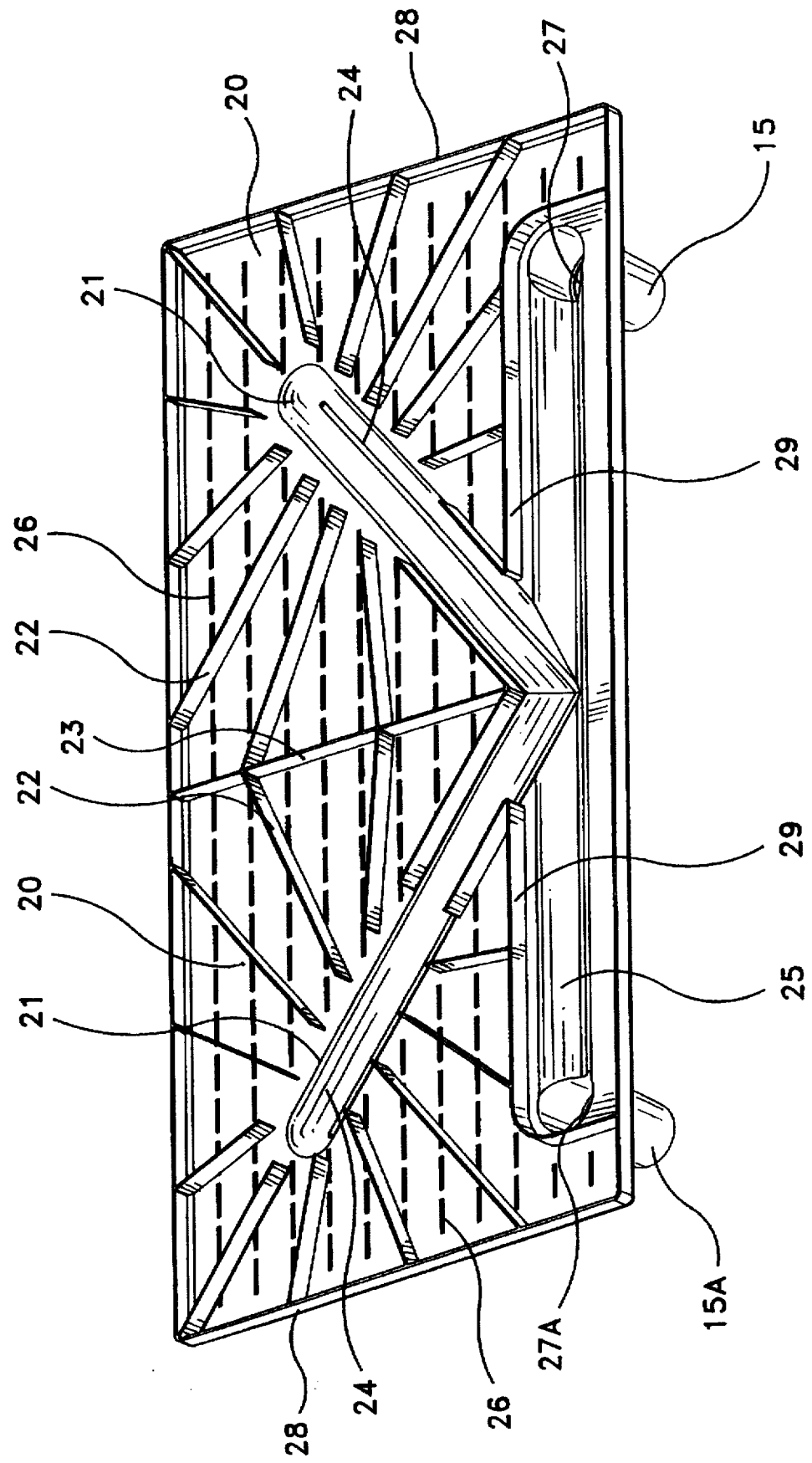
FIG. 2 is a perspective view of the bottom of the undergravel filter of the present invention.
Figure 3:
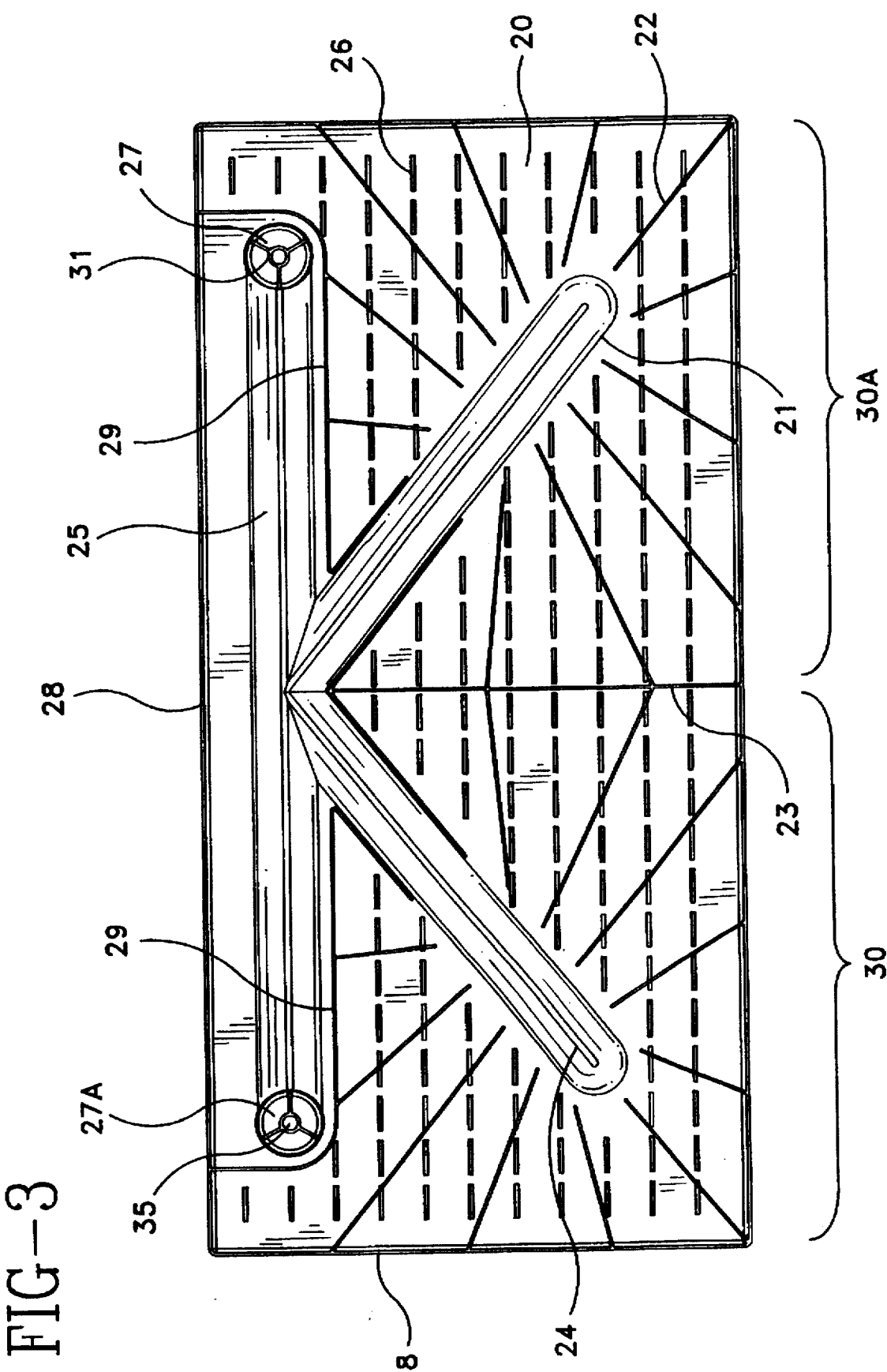
FIG. 3 is a bottom view of the undergravel filter of the present invention.

FIGS. 2 and 3 illustrate the bottom side of the undergravel filter plates. Preferably, while any number of plates may be utilized for the filter base, the filter consists of two plates 30 and 30A which are divided by a center wall 23. Slots 26 allow the water to filter down from the aquarium to below the plates. The plates are sealed to the floor of the aquarium 9 by wall 28 which, preferably, surrounds the filter. A plurality of chambers 20 are created by baffles 22 and wall 28, which extend between the plate and the floor of the aquarium. In the preferred embodiment illustrated, twelve chambers are used in each plate for a total of twenty four chambers for the entire filter. As illustrated, the chambers are each approximately equal in size. Each chamber contains one or more openings 21 which are adjacent to a flow channel and, preferably, each plate contains one flow channel.

In the illustrated embodiment, opening 21 at the base of each chamber allows water to flow from the chamber to a flow channel 24. Preferably, each plate contains one flow channel. Flow channels 24 are preferably in the shape of an inverted "V" such that water flows through the flow channel and on into central channel 25. The "V" shape is preferred in order to minimize the area on the top surface of the filter which is affected by the channels. In the preferred embodiment having two plates, the flow channels from each plate converge at a point on the central channel which is substantially at the center of the two plates. It is preferable to have the flow chambers converge in the center of the central channel so that when two airlifts are employed at either end of the plates the pull on the water from each airlift will be equal. The central channel 25 is preferably at least as wide as the width of the lift tube holes and collects water from the flow channel or channels and routes it toward a lift tube hole. In the preferred embodiment illustrated, two lift tube holes 27 and 27A are shown at either end of the central channel, however any number of holes may be used. In the event that more than one lift tube hole is provided but only one lift tube is in use, the user may cap off the unused holes. In a preferred embodiment, guard 35 is located within the hole to prevent over insertion of the airstone.

Figure 4:
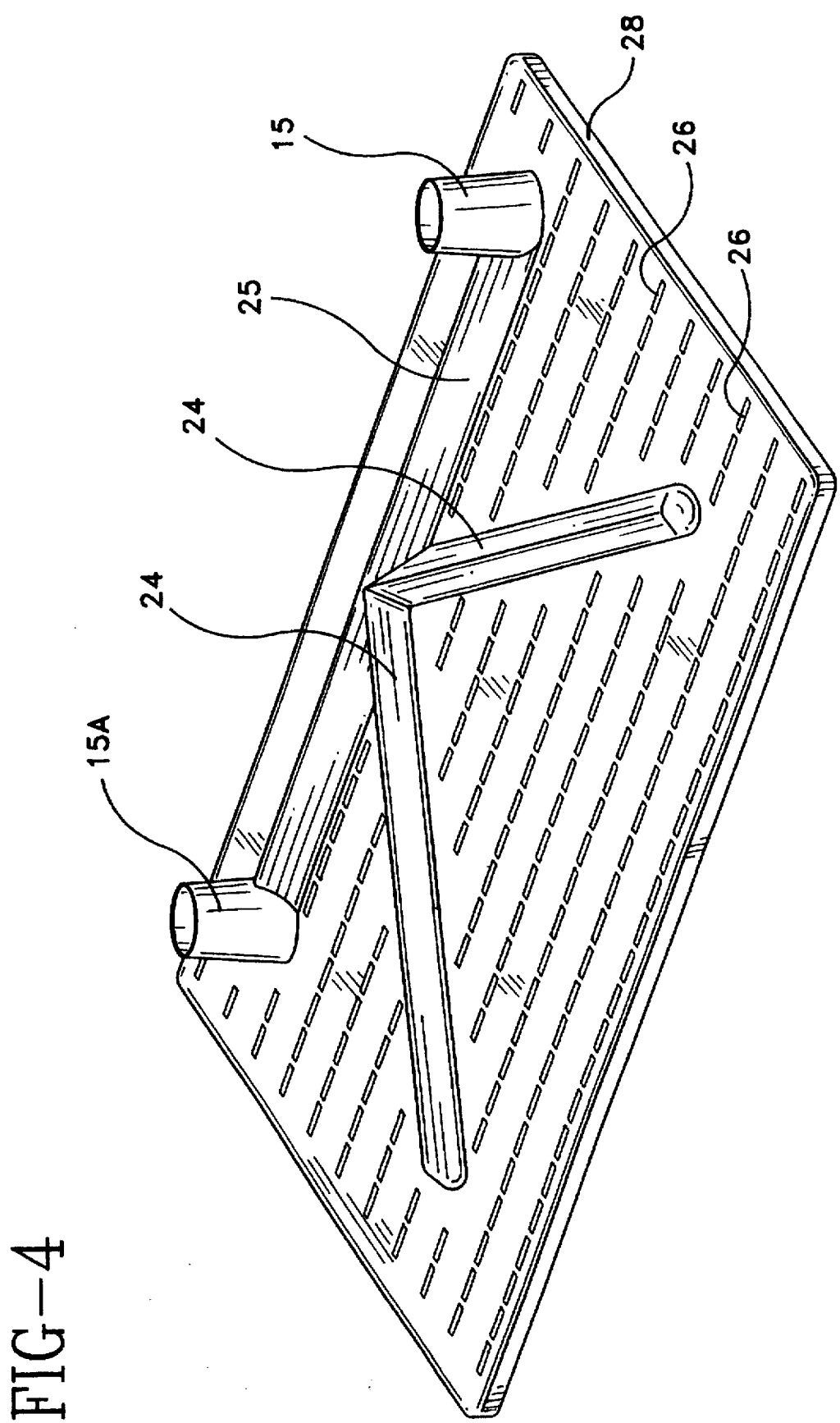
FIG. 4 is top view of the undergravel filter of the present invention without an anti-dig grid.

FIG. 4 illustrates the top of the undergravel filter in an embodiment having two plates. Slots 26 are arranged along the surface, and the top of the flow channels 24 and the central flow channel 25 extend upward above the surface of the plates. Lift tube bases 15 and 15A extend upward from the plates. Due to the arrangement of the chambers, the baffles between the chambers, and the openings, any drop of water which passes through the plate at any point will be drawn to the same point, i.e., the center of the central channel, as will as any other drop of water which passes through the plate at any other point. Consequently, each drop of water will travel the same path as each other drop of water through the flow channels and will create equal filtration throughout the filter.

Figure 5:
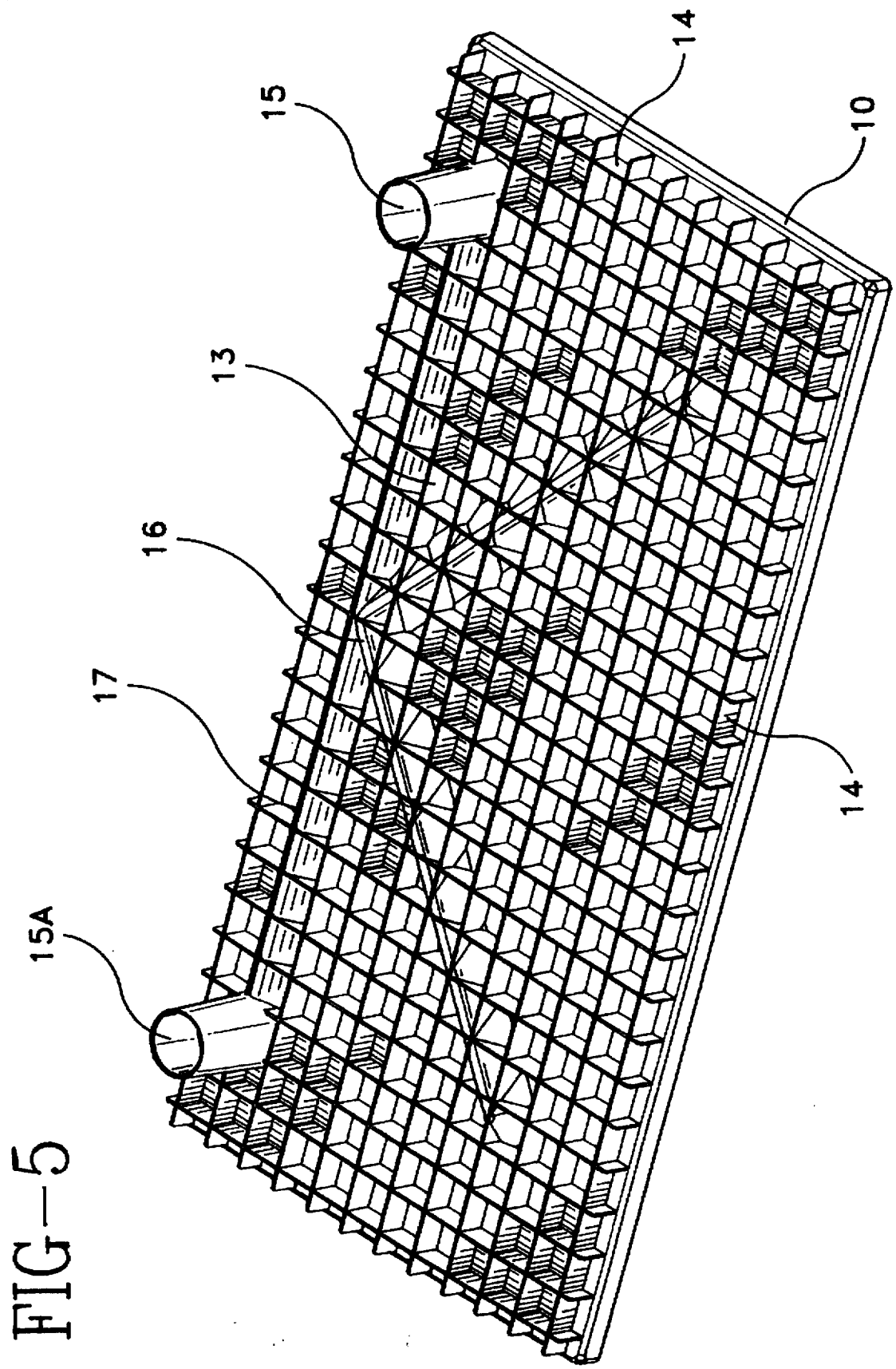
FIG. 5 is a perspective view of the top of the undergravel filter of the present invention.

As illustrated in FIGS. 5 and 6, a preferred embodiment of the invention includes an anti-dig grid which consists of a series of walls 14 which interlock to form the grid. The anti-dig grid may be either permanently or removably affixed to the plate of the filter. Preferably, these walls form boxes which are approximately square in shape. Openings, preferably in the form of slots 26, are located on the plate of the filter under the grid. During use in an aquarium, gravel is placed on the top of the grid. The gravel provides both biological and mechanical filtration to the water before the water reaches the filter. The biological filtration of the gravel is especially important because it provides for the conversion of ammonia and nitrite. The grid prevents fish from digging in the gravel and removing it from the slots in the filter. While the walls of the grid may be various sizes, one especially preferred size comprises walls which are in the range of ½ inch long and ½ inch high. This size is preferred because gravel fits well within the boxes and fish are unable to dig the gravel. The top side of the filter also contains one or more, and preferably two, lift tube bases 15 and 15A. One or more of these openings may be capped off if the number of lift tubes in use is less than the number of openings.

While the filter may be constructed from any water insoluble material, it is preferably constructed from a hard plastic. A preferred plastic is high impact polystyrene. This particular plastic provides the filter with its strength. The presence of the grid, along with the baffles, provides additional strength to resist potentially breaking forces, such as those caused by the placement of rocks or gravel on the filter. In an especially preferred embodiment, the plastic of the filter is not smooth but is textured to provide additional surface area on which biological filtration may take place.

While there have been described what are presently believed to be the preferred embodiments and methods of the invention, those skilled in the art will realize that various changes and modifications may be made to the invention without departing from the spirit of the invention, and it is intended to claim all such changes and modifications as fall within the scope of the invention.

We claim:

1. A filter for an aquarium comprising one or more plates, wherein each plate has a top, a bottom and openings to allow water to pass through the plate, and wherein the bottom side of the plates contains a flow channel having two ends and dividers which separate the bottom into separate chambers with each chamber having an opening adjacent to the flow channel wherein the flow channel is in the shape of an inverted "V" wherein the wide portion of the "V" is located adjacent the bottom of the plate and the narrow portion of the "V" is located at a distance away from the bottom of the plate.

2. A filter according to claim 1, wherein the flow channel is in communication with a central flow channel which is located at one end of the flow channel.

3. A filter according to claim 2, wherein the filter comprises two plates.

4. A filter according to claim 3, wherein the central flow channel contains one or more lift tube holes.

5. A filter according to claim 1, wherein the top side of the plate comprises a means to prevent fish from accessing the openings.

6. A filter according to claim 5, wherein the means comprises an anti-dig grid.

7. A filter according to claim 6, wherein the anti-dig grid comprises a series of interconnected walls which form square-shaped boxes.

8. A filter according to claim 1 which is constructed of polystyrene.

9. A filter according to claim 1, wherein the top surface of the plate is textured to enhance biological filtration.

10. A filter for an aquarium comprising one or more plates with each plate having openings to allow water to pass through the plate, dividers which separate the bottom side of the plate into separate chambers and a flow channel which collects water from the flow chambers and routes the water to a central flow channel, wherein the flow channel and central flow channel are aligned such that a drop of water passing through a first opening in the plate will be drawn to the same point as a drop of water passing through a second opening in the plate wherein the flow channel is in the shape of an inverted "V" wherein the wide portion of the "V" is located adjacent the bottom of the plate and the narrow portion of the "V" is located at a distance away from the bottom of the plate.

11. A filter according to claim 10, wherein the filter comprises two plates.

12. A filter according to claim 11, wherein the central flow channel contains one or more lift tube holes.

13. A filter according to claim 10, wherein the top side of the plate comprises a means to prevent fish from accessing the openings.

14. A filter according to claim 13, wherein the means comprises an anti-dig grid.

15. A filter according to claim 14, wherein the anti-dig grid comprises a series of interconnected walls which form square-shaped boxes.

16. A filter according to claim 10 which is constructed of polystyrene.

17. A filter according to claim 10, wherein the top surface of the one or more plates is textured to enhance biological filtration.

18. A method of filtering water in an aquarium using the apparatus of claim 12.

19. A method of filtering water in an aquarium using the apparatus of claim 1.

* * * * *